Patented Dec. 11, 1945

2,390,951

UNITED STATES PATENT OFFICE 2,390,951

PRODUCTION OF ISOBUTYLENE

Leonard N. Leum, Upper Darby, and Frank G. Ciapetta, Yeadon, Pa., assignors to The Atlantic Refining Company, Philadephia, Pa., a corporation of Pennsylvania No Drawing. Application October 7, 1942, Serial No. 461,236

3 Claims. (Cl. 260—683)

The present invention relates to the production of gas containing a high concentration of isobutylene from polymer liquid consisting predominantly of isobutylene-butene codimers. More particularly, the present invention is concerned with the production of gas containing at least 90 percent isobutylene, and preferably at least 95 percent isobutylene from the aforesaid polymer liquid, employing a depolymerizing catalyst such as an argillaceous adsorbent or a mineral acid such as phosphoric acid.

In the production of various products involving the use of isobutylene it has been found necessary to employ substantially pure isobutylene or a gas containing a high concentration of isobutylene. For example, in the production of "butyl" rubber by the reaction of isobutylene and butadiene, or in the manufacture of high molecular weight isobutylene polymers as agents for increasing the viscosity index or reducing the pour point of lubricating oils, the isobutylene must be of a relatively high degree of purity. In the production of high antiknock gasoline without the use of tetraethyl lead, i. e., 100 octane gasoline by the hydrogenation of isooctene, the isobutylene utilized in the preparation of the isooctene must be substantially pure.

It has been proposed heretofore to produce substantially pure isobutylene by the sulfuric acid polymerization of a mixture of isobutylene, butenes, and butane, under such conditions that only the isobutylene was converted to diisobutylene, which was separable from the unpolymerized butenes and butane. The relatively pure diisobutylene was then catalytically or thermally depolymerized to isobutylene. Another method proposed for the preparation of isobutylene of high purity was the selective conversion of the isobutylene content of a gaseous hydrocarbon mixture to the corresponding alcohol, i. e., tertiary butyl alcohol, and the subsequent dehydration of the alcohol to isobutylene. In these methods it was considered necessary to procure substantially pure diisobutylene or tertiary butyl alcohol as the raw material for the manufacture of relatively pure isobutylene.

In accordance with the present invention, we have found that a gas containing a high concentration of isobutylene may be produced from butylene polymers other than diisobutylene, without having the isobutylene contaminated with substantial quantities of butenes or butane. In the polymerization of gaseous hydrocarbons with phosphoric acid at elevated temperature for the production of motor fuel components, as disclosed in prior patents to Ipatieff #1,960,631 and #2,018,066, it has been found that the polymer liquid resulting from the phosphoric acid process consists predominantly of isobutylene-butene codimers, together with relatively small amounts of diisbutylene, butene polymers, and higher molecular weight polymers. The isobutylene-butene codimers comprise essentially a mixture of 3,4,4 trimethyl pentene-1; 3,4,4 trimethyl pentene-2; 2,3,4 trimethyl pentene-1; 2,3,4 trimethyl pentene-2; and minor amounts of 2,3,3 trimethyl pentene-1. The butene polymers appear to be predominantly 3,4 dimethyl hexene-1 and 3,4 dimethyl hexene-2, while the higher molecular weight polymers may include small amounts of trimers of isobutylene, and of butene-1 or butene-2.

We have found that this relatively complex polymer liquid comprising codimers, butene polymers, and minor amounts of diisobutylene is very satisfactory as a charging stock for the production of a gas containing a high concentration of isobutylene, i. e., a concentration of at least 90 percent and preferably at least 95 percent isobutylene.

In accordance with our invention, we subject this polymer liquid to thermal treatment in the presence of a catalyst which may be designated as a "depolymerizing" catalyst, although it may function additionally as an isomerization agent. As a result of this treatment, a substantial proportion of the polymer liquid is converted into isobutylene, without the appearance of substantial quantities of butene-1 or butene-2 which might normally be expected as a result of the depolymerization of the isobutylene-butene codimers. The isobutylene thus produced in high concentration may be separated from unconverted polymer liquid by suitable means, and the latter may be recycled for further conversion.

The thermal treatment in the presence of the catalyst may be carried out at temperatures between 400° F. and 1000° F., and preferably between 400° and 800° F., such temperature varying depending upon the catalyst used. The treatment may be carried out at subatmospheric, atmospheric, or superatmospheric pressure, and preferably at substantially atmospheric pressure. Catalysts which may be employed include argillaceous adsorbents such as fuller's earth, bentonite, acid activated bentonite or clay, bauxite, activated alumina, oxides or sulfides of metals of group VI of the periodic system, alkaline earth metal oxides, rare earth oxides, or mineral acids such as phosphoric acid, metaphosphoric acid or pyrophosphoric acid which may or may not be supported upon carriers such as diatomaceous earth, clay, titania, thoria, or the like. With fuller's earth catalyst, temperatures between 600 F. and 700° F. have been found satisfactory, a temperature of about 700° F. being preferred. On the other hand, with a catalyst such as phosphoric acid deposited on diatomaceous earth, temperatures between 400° F. and 700° F. may be utilized, a temperature of about 500° F. being preferred. The rate of charge of the polymer liquid to the heated catalyst may range from 0.5 to 5.0 volumes of polymer liquid per volume of catalyst per hour. The catalyst, upon becoming spent by reason of the accumulation of heavy polymers or carbonaceous materials, may be regenerated by treatment with appropriate solvent or by calcination in the presence of air, or by a combination of such methods.

In carrying out our conversion process, polymer liquid consisting predominantly of isobutylene-butene codimers may be vaporized in a conventional tubular heater and the vapors then brought into contact with the catalyst contained in a suitable vessel at the desired conversion temperature. The products from the conversion operation comprising isobutylene, unconverted polymer liquid, and higher polymers, may be separated by fractionation and the unconverted polymer liquid may be recycled for further treatment.

Our invention may be further illustrated by the following examples, which, however, are not to be construed as limiting the scope thereof.

2200 volumes of fresh charge consisting of 11 percent isobutylene, 13 percent normal butenes, and 76 percent butane, together with 500 volumes of recycle butane, was charged per day to a catalytic polymerization unit employing phosphoric acid deposited on diatomaceous earth. The unit was operated at a temperature of 290° F. to 330° F. under a pressure of 1050 pounds per square inch, and there was produced a polymer liquid comprising essentially 3.5 percent of di-isobutylene (boiling range 212° F. to 220° F.), 80 percent of isobutylene-butene codimer (boiling range 220° F. to 238° F.) and 17.5 percent of normal butene polymers (boiling range 238° F. to 250° F.).

In producing a gas having a high concentration of isobutylene, the whole polymer liquid was used in some cases, while in other cases the polymer liquid was fractionated to give a plurality of fractions, each of which was treated separately. One of the fractions had a boiling range of 230° F. to 240° F. and consisted of codimers, while a second fraction had a boiling range of 240° F. to 250° F. and consisted essentially of normal butene polymers. The conditions employed in the conversion operations, as well as the results obtained are presented in the following table.

| | Polymer liquid | Polymer liquid | Polymer liquid | 230° F.–240° F. fraction | 240° F.–250° F. fraction |
|---|---|---|---|---|---|
| Charge: | | | | | |
| Volume (c. c. at 60° F.) | 151.2 | 1,461 | 117.5 | 116.5 | 115.0 |
| Weights (gms.) | 111.3 | 1,072 | 86.5 | 86.1 | 84.6 |
| Gravity (A. P. I.) degrees | 60.8 | 61.2 | 60.8 | 60.0 | 58.4 |
| Catalyst: | | | | | |
| Type | Fuller's earth | Fuller's earth | H$_3$PO$_4$ on SiO$_2$ | Fuller's earth | Fuller's earth |
| Volume (c. c.) | 30 | 60 | 30 | 30 | 30 |
| Conditions: | | | | | |
| Catalyst temp. (° F.) | 714 | 690 | 503 | 702 | 704 |
| Space velocity (60° F.) | 2.52 | 2.03 | 1.96 | 1.94 | 1.90 |
| Running time (hrs.) | 2 | 12 | 2 | 2 | 2 |
| Products: | | | | | |
| Liquid: | | | | | |
| Weight (gms.) | 68.8 | 604 | 61.6 | 38.2 | 41.7 |
| Gravity (A. P. I.) degrees | 67.4 | 70.0 | 65.9 | 68.7 | 68.7 |
| Gas: | | | | | |
| Volume (l. @ 32° F.) | 13.9 | 150.7 | 5.6 | 14.3 | 12.5 |
| Weight (gms.) | 35.4 | 386 | 15.4 | 36.6 | 32.1 |
| Density (gm./l. @ 32° F.) | 2.54 | 2.56 | 2.58 | 2.55 | 2.56 |
| Yields (based on chg.): | | | | | |
| Liquid (weight percent) | 61.8 | 56.3 | 71.3 | 44.4 | 49.3 |
| Gas (weight percent) | 31.8 | 36.0 | 17.8 | 42.5 | 37.9 |
| Loss (weight percent) | 6.4 | 7.7 | 10.9 | 13.1 | 12.8 |
| Yields: | | | | | |
| Mol. percent isobutylene in C$_4$ gas fraction | 97.3 | 94.2 | 99.0 | 93.2 | 91.2 |

From the results above given, it will be evident that in accordance with our invention, we are able to produce gas containing a high concentration of isobutylene from polymer liquids comprising predominantly isobutylene-butene dimers and minor amounts of butene polymers and di-isobutylene. In all cases, a concentration of at least 90 mol. percent of isobutylene was obtained despite the fact that the codimers in the charge liquid contained 50 percent of normal butene radicals. Furthermore, in the case of the charge liquid comprising the polymer fraction having a boiling range of 240° F. to 250° F., a gas containing 91.2 mol. percent of isobutylene was obtained, although the polymer fraction charged consisted predominantly of normal butene polymers, i. e., polymers of butene-1 and butene-2. It therefore appears that the production of high yields of isobutylene in accordance with our process involves not only depolymerization but also isomerization of the hydrocarbons produced by the depolymerization.

We claim:

1. The method of producing a gas containing isobutylene in high concentration from polymer liquid consisting predominantly of isobutylene-butene codimers, which comprises contacting the polymer liquid with an argillaceous catalyst at a temperature between 600° F. and 800° F., and separating the resulting gas containing a high concentration of isobutylene from the unconverted polymer liquid.

2. The method of producing a gas containing isobutylene in high concentration from polymer liquid consisting predominantly of isobutylene-butene codimers, which comprises contacting the polymer liquid with a fuller's earth catalyst at a temperature between 600° F. and 700° F., and separating the resulting gas containing a high concentration of isobutylene from the unconverted polymer liquid.

3. The method of producing a gas containing at least 90 percent isobutylene from polymer liquid consisting predominantly of isobutylene-butene codimers, which comprises contacting the polymer liquid with a fuller's earth catalyst at a temperature of about 700° F., and separating the resulting gas containing at least 90 percent isobutylene from the unconverted polymer liquid.

LEONARD N. LEUM.
FRANK G. CIAPETTA.